United States Patent [19]
Reich

[11] Patent Number: 5,682,838
[45] Date of Patent: Nov. 4, 1997

[54] CAT TOY

[76] Inventor: Marvin Reich, 400 Quaint Acres Dr., Silver Spring, Md. 20904

[21] Appl. No.: 633,181

[22] Filed: Apr. 16, 1996

[51] Int. Cl.⁶ .................................................. A01K 29/00
[52] U.S. Cl. ........................ 119/711; 119/709; 383/66
[58] Field of Search ........................ 119/707, 708, 119/709, 710, 711; 446/369; 150/143, 152; 383/42, 57, 61, 66, 84, 85

[56] References Cited

U.S. PATENT DOCUMENTS

| | | | |
|---|---|---|---|
| 1,265,926 | 5/1918 | Ludlam | 446/711 |
| 4,742,799 | 5/1988 | Schlitz | 119/707 |
| 4,928,632 | 5/1990 | Gordon | 119/709 |
| 5,090,938 | 2/1992 | Reynolds | 446/369 |
| 5,141,465 | 8/1992 | Stellman | 446/369 X |
| 5,287,960 | 2/1994 | Kalb et al. | 383/66 X |
| 5,326,300 | 7/1994 | Sonders | 446/369 X |

*Primary Examiner*—Robert P. Swiatek
*Assistant Examiner*—Yvonne R. Abbott
*Attorney, Agent, or Firm*—Jay M. Cantor

[57] ABSTRACT

A container for enclosing particulate matter for use as an animal toy constructed or sewn fabric being provided with hook and loop sealing wherein an extension of the container body forms a protection for the Velcro sealer before the hook and loop forms the seal, thereby protecting the Velcro from the particulate contents of the toy. The contents of the toy preferably comprise catnip. The toy can take any shape and/or color combination, such as that of fruit, a vegetable or an animal, preferably a rodent.

10 Claims, 1 Drawing Sheet

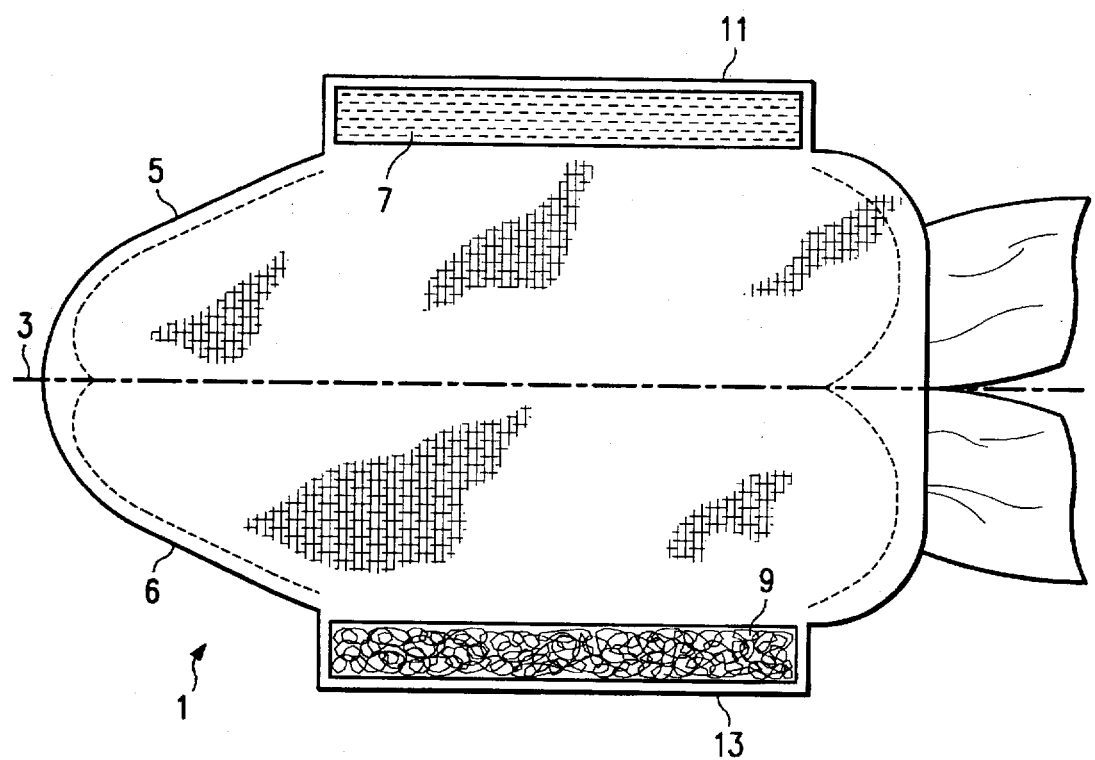

CAT TOY

BACKGROUND OF THE INVENTION

FIELD OF THE INVENTION

This invention relates to cat toys and more particularly to cat toys containing a replaceable filling, preferably of catnip.

BRIEF DESCRIPTION OF THE PRIOR ART

Toys for animals and especially for cats which contain a filler of catnip are well known and generally can be found in any pet store or other source of animal toys. A problem with such toys is that the catnip becomes stale and cannot be replaced because the catnip has been presealed within the toy by sewing or the like.

In the prior art there are also many forms of sealed containers which can be unsealed and resealed which are also refillable. Many of these types of containers utilize hook and loop strips, for sealing the container. Examples of such containers are patents of Kabana U.S. Pat. No. (3,275,053), Morris U.S. Pat. No. (3,826,296), Cortner, Jr. U.S. Pat. No. (3,972,309), Edgerton, Jr. U.S. Pat. No. (3,998,304) and Howard U.S. Pat. No. (4,079,767). These closures generally operate satisfactorily for their intended purpose. However, when one attempts to fill the prior art container with substances similar in form to loose catnip, the catnip tends to adhere to hooks and loops of the hook and loop strip either during the catnip filling stage of the receptacle, during the closing stage of pressing the hook and loop strips together or by backup of the catnip filling onto the hook and loop. Once the catnip adheres to the hook and loop strips, it becomes difficult if not impossible to properly seal the container or pouch containing the catnip. It is therefore apparent that, to provide a cat toy containing a replaceable supply of catnip therein, ordinary hook and loop disposed at opposing edges of the container is unsatisfactory.

SUMMARY OF THE INVENTION

In accordance with the present invention, there is provided a refillable catnip toy utilizing a hook and loop type strip arrangement which also avoids the above enumerated problems inherent in prior art enclosures using hook and loop.

Briefly, there is provided an enclosure in the shape of a toy, such as, for example, a mouse, having an opening for entry and removal of a filling material, preferably catnip and having the hook and loop which seals the toy provided with a protective device which is a part of the toy and which protects the hook and loop from being contaminated with the filling ingredients. To this end, an isolator is provided which isolates the seal from the opening in the container through which the catnip is placed into the toy during filler filling and removal and before the hook and loop elements are pressed tightly together to provide the closure, thereby finally sealing the toy. The isolator also lies over the filling to provide a barrier between the filling and the hook and loop to minimize the possibility of filling backing up onto temporarily unsealed regions of the hook and loop during use. The isolator is preferably a portion of the enclosure material which extends within the enclosure when in the sealed condition and which can be folded back over the hook and loop elements during entry and removal of catnip from the container and which is folded over the filler during use. These toys may take various forms and shapes, such as vegetables (carrot, cucumbers, etc.), animal shapes (such as mice or rats) or even fruits (such as bananas, apples, pears, strawberries, etc.)

BRIEF DESCRIPTION OF THE DRAWINGS

The Figure is a top view of a blank in accordance with the present invention.

DESCRIPTION OF THE PREFERRED EMBODIMENT

Referring to the Figure, there is shown a first embodiment of the invention wherein there is shown a blank cut of material 1 which will ultimately form a carrot shape when folded along the center line 3 and the opposing edges 5, 6 sewn together with the exception of the portion of the blank above and below the hook and loop strips 7 and 9 which are left unsewn. The blank has the strips of hook and loop 7 and 9 attached to the carrot shape spaced from the edges 11 and 13 and on the exterior of the carrot after the edges are sewn together. When the hook and loop 7, 9 is folded inwardly, one edge of the hook and loop will be in line with the sewn carrot shape edges 11 and 13. The whole flap area shown in FIG. 1 containing hook and loop strips 7, 9 and the portions of the blank 1 between the hook and loop 7, 9 and the edges 11 is external of the carrot when filling is to take place with the non-hook and loop portion of the flap area extending over the hook and loop to prevent attachment of container filler to the hook and loop during filling and to rest over the filling and act as a barrier between the filling and hook and loop after sealing and during use.

In operation, the flap with protected hook and loop is maintained away from the opening in the container and the container is then filled with filler, preferably catnip. The non-hook and loop portion of the flap is then rotated into the interior of the container and over the filler therein and the hook and loop strips 7, 9 are brought together to provide the required seal in standard manner. When the filler is to be removed, the hook and loop strips 7, 9 are parted and rotated away from the opening to the container and the non-hook and loop portion of the flap is rotated over the Velcro to protect the hook and loop from the filler being removed from the container. The filler is then removed with the hook and loop strips being protected from filler contamination.

While the preferred embodiment has been described with respect to a carrot as the toy, it should be understood that the carrot shown in FIG. 1 can also have any shape and/or coloring, such as, for example, that of an animal, fruit, vegetable, etc.

It is to be noted that the protectors for the sealer (hook and loop) are contiguous with the body of the toy and cut from the same material from which the body of the toy is manufactured. The sealer protector is part of the body fabric and does not require any additional sewing or adhesive attachment and forms a protective closure which is very economical to provide without the incurrence of any additional labor in the process of toy manufacture.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A container for enclosing particulate matter for use as an animal toy constructed of sewn fabric and provided with a sealable opening and having hook and loop sealing means at said sealable opening for sealing said particulate matter within said container, the improvement comprising:

(a) an extension of said container body extending from said opening and foldable both over said hook and loop sealing means and into said opening to provide a first seal for said container before said hook and loop sealing means engages to protect said hook and loop sealing means from contact with the particulate contents of said toy.

2. A container for enclosing particulate material as described in claim 1 wherein said container takes the form of a rodent.

3. A container for enclosing particulate material as described in claim 2 wherein said particulate matter comprises catnip.

4. A container for enclosing particulate material as described in claim 1 wherein said particulate matter comprises catnip.

5. A container for enclosing particulate material as described in claim 1 wherein said container takes the shape of a carrot.

6. A container for enclosing particulate material as described in claim 5 wherein said particulate matter comprises catnip.

7. A fabric container for enclosing particulate matter for use as an animal toy, said container having an opening and being provided with hook and loop sealing means at said opening for sealing said opening, the improvement comprising said fabric extending outwardly from said opening and beyond said hook and loop sealing means providing a first seal for said container before said hook and loop sealing means can engage to protect said hook and loop sealing means from contacting said particulate matter within said toy.

8. The container of claim 7 wherein said fabric which protects the hook and loop sealing means is made out of the same material as the outer body of said device and said material being contiguous with said outer body.

9. A method of making a cat toy which comprises the steps of:

(a) providing a container for enclosing particulate matter for use as an animal toy constructed of sewn fabric and provided with a sealable opening and having hook and loop sealing means at said sealable opening for sealing said particulate matter within said container, an extension of said container body extending from said opening and beyond said hook and loop and foldable both over said hook and loop and into said opening to provide a first seal for said container before said hook and loop engages thereby protecting said hook and loop from the particulate contents of said toy;

(b) filling said container with a filler;

(c) folding said fabric extension from over said hook and loop into said container and over said filler within said container; and (d) sealing said container with said hook and loop.

10. The method of claim 9 further including the step of folding said fabric extension extending from said opening and beyond said hook and loop over said hook and loop after step (a) and prior to step (b).

* * * * *